United States Patent [19]

Bugnon et al.

[11] Patent Number: 5,271,769
[45] Date of Patent: Dec. 21, 1993

[54] METHOD OF IMPROVING STORAGE STABILITY OF PIGMENTS

[75] Inventors: Philippe Bugnon, Essert; Abul Iqbal, Arconciel, both of Switzerland; Alison MacLennan, Bridge of Weir; Iain F. Fraser, Kilbirnie, both of Scotland

[73] Assignee: Ciba-Geigy Corporation, Ardsley, N.Y.

[21] Appl. No.: 928,824

[22] Filed: Aug. 11, 1992

[30] Foreign Application Priority Data

Aug. 16, 1991 [GB] United Kingdom ................. 9117765

[51] Int. Cl.$^5$ .............................................. C09B 67/08
[52] U.S. Cl. ..................................... 106/419; 106/437; 106/450; 106/481; 106/499
[58] Field of Search ............... 106/437, 499, 419, 450, 106/481

[56] References Cited

U.S. PATENT DOCUMENTS

| | | | |
|---|---|---|---|
| 3,904,562 | 9/1975 | Hopfenberg et al. | 523/200 |
| 4,325,862 | 4/1982 | Schuster | 524/87 |
| 4,417,013 | 11/1983 | Schuster | 524/87 |
| 4,464,203 | 8/1984 | Belde et al. | 106/413 |
| 4,808,230 | 12/1989 | Bugnon et al. | 106/483 |
| 4,889,562 | 12/1989 | Bugnon et al. | 106/204 |

FOREIGN PATENT DOCUMENTS

| | | |
|---|---|---|
| 022746 | 1/1981 | European Pat. Off. . |
| 835637 | 5/1960 | United Kingdom . |
| 1537986 | 1/1979 | United Kingdom . |
| 1588777 | 4/1981 | United Kingdom . |

OTHER PUBLICATIONS

Derwent Abst. 87-299965/43, Oct. (1987).

*Primary Examiner*—Karl Group
*Assistant Examiner*—Scott L. Hertzog
*Attorney, Agent, or Firm*—JoAnn Villamizar; George R. Dohmann

[57] ABSTRACT

A method of improving the storage stability of a coloured organic pigment in powder form which comprises coating pigment particles with a solid polymer which is a polar group-containing vinyl polymer, said polar group being a hydroxy, carboxyl, carboxylic ester, anhydride or carboxamide group, or a cellulosic polymer, thereby inhibiting reduction of tinting strength of the pigment on storage.

20 Claims, No Drawings

METHOD OF IMPROVING STORAGE STABILITY OF PIGMENTS

This invention relates to a method of improving the storage stability of pigments, particularly coloured organic pigments, in powder form, and to storage stable pigment compositions.

It has been found that the tinting strength of a pigment in powder form tends to decrease with increased storage time of the powder. This problem is particularly notable with monoazo pigments.

It has now been found that by forming on pigment particles a coating of a solid polar group—containing vinyl or cellulosic polymer, storage stability and therefore retention of tinting strength of pigments in powder form can be significantly improved.

It is known to coat pigments with polymers to improve their resistance to solvents and to other materials in which they are incorporated. U.S. Pat. No. 4,889,562 describes the coating of organic pigments with crosslinked ethylcellulose to improve their rheological properties.

Accordingly, the present invention provides a method of improving the storage stability of a coloured organic pigment in powder form which comprises coating pigment particles with a solid polymer which is a solid polar group-containing vinyl polymer, said polar group being a hydroxy, carboxyl, carboxylic ester, anhydride or carboxamide group, or a cellulosic polymer, thereby inhibiting reduction of the tinting strength of the pigment on storage.

In another aspect, the present invention provides the use of a solid polar group-containing vinyl polymer, said polar group being as hereinbefore defined, or a cellulosic polymer as a powder stabilising coating on coloured organic pigment particles, thereby inhibiting reduction of the tinting strength of the pigment on storage.

Examples of polar group-containing vinyl polymers are homopolymers of carboxylic acids such as acrylic acid, methacrylic acid, esters such as alkyl acrylates, alkyl methacrylates, vinyl acetate and vinyl propionate, anhydrides such as maleic anhydride and amides such as acrylamide, methacrylamide and N-vinyl-2-pyrrolidone; copolymers of two or more of the abovementioned monomers; and copolymers of at least one of the abovementioned monomers with at least one other ethylenically unsaturated material, for example styrene, vinyl chloride, or acrylonitrile.

Preferred polar group—containing vinyl polymers include N-vinylpyrrolidone polymers and polyhydroxy or polycarboxy vinyl polymers, that is vinyl polymers having, on average, more than one hydroxy or carboxyl group per molecule. Examples of polyhydroxy vinyl polymers are polyvinyl alcohols, which may be, for example, hydrolysis products of vinyl acetate homopolymers or copolymers and which may contain ester, ether or acetal groups as well as hydroxy groups; polymers of hydroxyl-containing acrylic monomers, for example homopolymers of hydroxyalkyl acrylates and hydroxyalkyl methacrylates such as 2-hydroxyethyl acrylate, 2-hydroxypropyl acrylate, 3-hydroxypropyl acrylate and the corresponding methacrylates, and copolymers thereof with other ethylenically unsaturated monomers such as alkyl acrylates and alkyl methacrylates; and polymers of allyl alcohol, for example homopolymers thereof and copolymers thereof with other ethylenically unsaturated monomers.

Preferred polyhydroxy vinyl polymers are polyvinyl alcohols, which may have number average molecular weights of from 5,000 to 100,000, preferably from 10,000 to 50,000, especially from 10,000 to 20,000. Such polymers are readily available commercially or may be prepared using conventional procedures. A polyvinyl alcohol may be formed in situ by hydrolysis of a vinyl acetate polymer in a dispersion of the pigment.

Preferred polycarboxy vinyl polymers are polyacrylic acids, which may be homopolymers of acrylic acid or methacrylic acid or copolymers of acrylic and/or methacrylic acid with at least one other ethylenically unsaturated material, for example an acrylic ester such as ethyl acrylate or 2-ethylhexyl methacrylate, an ethylenically unsaturated hydrocarbon such as styrene, α-methylstyrene or 4-methylstyrene, an ethylenically unsaturated amide such as acrylamide or methacrylamide or an ethylenically unsaturated nitrile such as acrylonitrile or methacrylonitrile.

Examples of N-vinylpyrrolidone polymers are homopolymers of N-vinyl-2-pyrrolidone and copolymers thereof with at least one other ethyenically unsaturated material, such as styrene, vinyl chloride, acrylonitrile, vinyl propionate or, preferably, vinyl acetate. Preferred N-vinyl pyrrolidone polymers are homopolymers of N-vinyl-2-pyrrolidone. The N-vinyl pyrrolidone polymer preferably has a number average molecular weight of 5000 to 500,000, more preferably 10,000 to 100,000, especially 20,000 to 50,000.

Preferred cellulosic polymers are polyhydroxy cellulosic polymers, i.e. those having, on average, more than one hydroxy group per molecule. These include cellulose itself, partial esters of cellulose such as cellulose monoacetate and cellulose ethers such as methylcellulose, ethylcellulose, 2-hydroxyethylcellulose, 2-hydroxypropylcellulose, sodium carboxymethylcellulose, ethyl 2-hydroxyethylcellulose, 2-hydroxyethyl methylcellulose, 2-hydroxypropyl methylcellulose, 2-hydroxybutyl methylcellulose and 2-hydroxyethyl ethylcellulose. A preferred cellulosic polymer is ethylcellulose.

In a convenient method of producing the coated pigment, the vinyl or cellulosic polymer, or a solution or dispersion thereof in a liquid, is mixed with a dispersion, preferably an aqueous dispersion, of the pigment until pigment particles are coated with the polymer, and coated pigment particles are separated from the resulting mixture, usually by filtration. The separated coated pigment particles, obtained, for example, as a presscake, may be dried by heating to form a powder. Preferably a solution of the polymer in water, a water-miscible organic solvent or a mixture thereof is mixed with an aqueous dispersion of the pigment. The pigment dispersion is conveniently formed by redispersing a pigment presscake in water or a mixture of water with a minor amount of a water-miscible organic solvent. The mixture of pigment dispersion and polymer or polymer solution may be heated, if desired. Optimum conditions, such as temperature and stirring times, for particular pigments and coating polymers can readily be determined by simple experiment.

The formation of the polymer coating on the pigment particles may be as a result of adsorption of the polymer on the surface of the pigment. Where the polymer is in solution in an organic solvent, it may be helpful to add water to facilitate adsorption of the polymer on the pigment. If desired the polymer may be precipitated from a solution thereof onto the pigment particles by addition of a precipitant salt such as sodium chloride or sodium sulphate to the mixture of the pigment dispersion and the polymer solution.

The vinyl or cellulosic polymer is generally used in an amount of 0.1 to 20%, preferably 1 to 15%, by weight, of the pigment.

The coating of the vinyl or cellulosic polymer on the pigment particles may be crosslinked by treatment of the polymer with a crosslinking agent therefor. This treatment is conveniently carried out in the liquid medium in which coating of the pigment particles is effected before separation of the coated particles from the medium, although it could be carried out by treating the coated pigment particles with the crosslinking agent after such separation, for example in another solvent or mixture of solvents.

Suitable crosslinking agents include boron oxyacids and their salts, for example boric acids such as orthoboric acid, metaboric acid and polyboric acids and their salts, usually alkali metal salts, and boronic acids, usually alkaneboronic acids such as methaneboronic and ethaneboronic acids or arylboronic acids such as phenylboronic acid, and their salts; phosphoric acids, such as orthophosphoric acid, and their salts, usually alkali metal salts; aliphatic and aromatic aldehydes such as formaldehyde, acetaldehyde, propionaldehyde, n-butyraldehyde, isobutyraldehyde, n-valeraldehyde, n-caproaldehyde, n-heptaldehyde, glyoxal, succinic dialdehyde, glutaric dialdehyde, adipic dialdehyde and benzaldehyde; carboxylic acids and their halides or salts, usually di(acid halides) of dicarboxylic acids such as oxalic acid, malonic acid, succinic acid, glutaric acid, adipic acid, tetrahydrophthalic acid, hexahydrophthalic acid and phthalic acid; alkylene dihalides, usually $C_1$ to $C_6$ alkylene dihalides such as methylene-, ethylene-, ethylidene-, trimethylene-, tetramethylene-, penthamethylene- and hexamethylene dihalides, usually dibromides or, preferably, dichlorides; aluminium salts such as aluminium nitrate, aluminium sulphate, sodium aluminium sulphate or potassium aluminium sulphate; zinc compounds, including salts and complexes such as zinc chloride, zinc acetate, zinc benzoate, zinc glycinate, zinc alaninate, zinc ammonium bicarbonate or zinc ammonium glycinate; and polyisocyanates, usually diisocyanates such as 1,2-propylene-, 1,4-butylene-, pentamethylene-, hexamethylene-, dodecamethylene-, 1,4-cyclohexylene-, and methyl-2, 4-cyclohexylene diisocyanates, 3-isocyanatomethyl-3, 5,5-trimethylcyclohexyl isocyanate (isophorone diisocyanate), 2,4- and 2,6-tolylene diisocyanates and 4,4$^1$-diphenylmethanediisocyanate.

Other suitable crosslinking agents are alkoxides of elements of Group IVA or Group IVB of the Periodic Table, usually having at least two alkoxy groups per molecule, trialkoxides and tetra-alkoxides being preferred. The alkoxides are usually those of tin, lead, germanium or, preferably, of silicon, titanium or zirconium. The alkoxide groups preferably each have from 1 to 4 carbon atoms, as in sec-butoxide or tert-butoxide groups or, especially, methoxide, ethoxide, n-propoxide, isopropoxide, or n-butoxide groups.

Further suitable crosslinking agents are inorganic silicon (IV), tin (IV), titanium (IV) and zirconium (IV) compounds, including silicates which form active silica on hydrolysis, e.g. as described in U.S. Pat. No. 3,370,971 and 3,639,133, such as silicic acid, metasilicates or sodium silicate, tin (IV) chloride, titanium (IV) oxysulphate, zirconium (IV) acetate, zirconium (IV) nitrate, also known as zirconyl nitrate, zirconium (IV) oxychloride ($ZrOCl_2$) and zirconium (IV) orthosulphate, also known as zirconyl sulphate; and aluminates which form alumina on hydrolysis, including water-soluble aluminates such as sodium, potassium and magnesium aluminates.

It will be apparent that choice of the crosslinking agent for a particular coating polymer will depend on the nature of the reactive groups present in that polymer. For example, many of the abovementioned crosslinking agents can be used to crosslink hydroxyl- or carboxyl-containing polymers, whereas some of these agents are used normally with hydroxyl-containing polymers and others are used normally with carboxyl-containing polymers.

Preferred crosslinking agents, particularly for use with hydroxyl-containing polymers, include boric acids and their salts, preferably sodium and potassium salts, especially orthoboric acid and sodium tetraborate; phosphoric acids and their salts, preferably sodium and potassium salts, especially sodium orthophosphate; silicon (IV) trialkoxides or tetra-alkoxides, preferably trialkoxysilyl-substituted $C_1$ to $C_6$ alkyl esters of acrylic or methacrylic acid, especially 3-(trimethoxysilyl)propyl methacrylate; silicates which form active silica on hydrolysis, especially sodium silicate; aluminates which form alumina on hydrolysis; and zirconium (IV) compounds, especially zirconium (IV) acetate. Other preferred crosslinking agents, particularly for use with carboxyl-containing polymers, are zinc compounds, especially zinc acetate.

In a convenient method of effecting treatment of the coated pigment, the crosslinking agent or a solution thereof in water, a water-miscible organic solvent or mixture thereof is mixed with an aqueous dispersion of the polymer-coated pigment and, after crosslinking, pigment particles having a crosslinked coating are separate from the resulting reaction mixture. The aqueous dispersion of the polymer-coated pigment is conveniently that produced by mixing the polymer, or a solution or dispersion thereof, with an aqueous dispersion of the pigment until pigment particles are coated with the polymer as hereinbefore described.

The crosslinking agent may be used in an amount of 0.01 to 1.5 mol, preferably 0.05 to 0.5 mol, per reactive group, e.g. hydroxy, equivalent of the vinyl or cellulosic polymer; it may be added to the coated pigment dispersion directly or as a solution in water, a water-miscible organic solvent such as an alcohol or a mixture thereof.

The mixture of coated pigment dispersion and crosslinking agent generally has a pH of 5 to 10, preferably 7 to 10. The pH is usually controlled by the addition of a water-soluble base to the aqueous medium. Such bases include alkali metal hydroxides and carbonates, conveniently added as aqueous solutions. When an active silica-forming silicate is used as crosslinking agent, the pH of the aqueous dispersion of coated pigment is usually adjusted to 7-10 by addition of a base and the silicate is added slowly together with a hydrolysing acid, usually sulphuric acid, while the pH is maintained above 7.

The reaction mixture may be heated to effect crosslinking, for example to a temperature up to 95° C., preferably 60°-95° C. The crosslinking reaction time may be, for example, from 0.1 to 8 hours; in general reaction is sufficiently complete within 0.2 to 2 hours. The pigment particles having a crosslinked polymer coating can be separated from the reaction mixture by filtration, washed, stored as presscake if desired and then dried to give a coated pigment powder.

Powder compositions comprising particles of a coloured organic pigment coated with a crosslinked solid polar group-containing vinyl polymer, particularly a polyhydroxy vinyl polymer or a polycarboxy vinyl polymer, are novel. Accordingly, the present invention also provides a particulate composition comprising particles of a coloured organic pigment coated with a crosslinked solid polar group-containing vinyl polymer, particularly a polyhydroxy vinyl polymer or a polycarboxy vinyl polymer. The vinyl polymer and the crosslinking agent are as hereinbefore described, i.e. the polymer is preferably a polyvinyl alcohol which is preferably crosslinked by a boric acid or a salt thereof, a phosphoric acid or a salt thereof, a silicon (IV) trialkoxide or tetra-alkoxide, a silicate which forms active silica on hydrolysis, an aluminate which forms alumina on hydrolysis, or a zirconium (IV) compound, or a polyacrylic acid which is preferably crosslinked by a zinc compound.

In the method and composition of the invention, the pigment may be, for example, a monoazo pigment, a diazo pigment, a phthalocyanine, a quinacridone, an indanthrone, a flavanthrone, a pyranthrone, a perylene, a thioindigo, a dioxazine, a perinone, an isoindoline, an isoindolinone, a diketopyrrolopyrrole, a basic dye complex or a metal complex. The invention is particularly useful where the pigment is a monoazo pigment, for example an arylamide pigment of formula

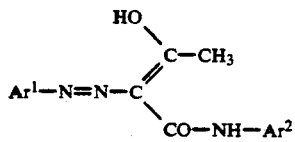

I where $Ar^1$ denotes a phenyl group substituted by one or two substituents selected from $C_1$ to $C_4$ alkyl (preferably methyl), halogen (preferably chlorine), nitro or $C_1$-$C_4$ alkoxy (preferably methoxy) and $Ar^2$ denotes a phenyl group which is unsubstituted or substituted by one or two substituents selected from $C_1$-$C_4$ alkyl (preferably methyl), $C_1$ to $C_4$ alkoxy (preferably methoxy) and halogen (preferably chlorine); or a pigment of formula $$Ar^1-N=N-Ar^3 \qquad II$$

where $Ar^1$ is as defined above and $Ar^3$ denotes a 2-hydroxynaphthyl group which may be further substituted by a group -CONHAr$^2$ where $Ar^2$ is as hereinbefore defined. Such pigments include C.I. Pigments Yellow 1, Yellow 3, Yellow 4, Yellow 5, Yellow 73, Yellow 98, Yellow 111 and, especially, Yellow 74; and C.I. Pigments Red 3, Red 12 and, especially, Orange 5. The invention is also particularly useful where the pigment is a basic dye complex such as C.I. Pigment Violet 3.

Various co-additives may be used together with a pigment treated according to the invention in pigment compositions. Examples of such co-additives, which are generally used in a total amount of 1 to 50% by weight of the total pigment composition, include surfactants, resins and long chain fatty acids and amines. Surfactants used may be of the anionic type, such as fatty acid taurides, fatty acid N-methyltaurides, fatty acid isothionates, alkylbenzenesulphonates, alkylnaphthalenesulphonates, alkylphenol polyglycol ether sulphates and fatty alcohol polyglycol ether sulphates; fatty acids, such as palmitic, stearic and oleic acids; soaps such as alkali metal salts of fatty acids and naphthenic acids; cationic surfactants include quaternary ammoniun salts, and N-oxides of tertiary amines or salts thereof; non-ionic surfactants include fatty alcohol polyglycol ethers (ethoxylated fatty alcohols), fatty acid polyglycol esters, alkylphenol polyglycol ethers and dialkyl polyglycol ethers. Resins include wood rosin, hydrogenated wood rosin, and polyamide resins e.g. those produced by condensing phthalic anhydride with long chain amines. Amines which may be added include long chain primary amines e.g. stearylamine; amine derivatives of wood rosin; N-long chain alkylalkylene diamines; polyamines; beta-amines, polyamide/polyamine derivates of ethoxylated fatty amines and diamines, and derivatives of these compounds.

The present invention also provides a high molecular weight material pigmented with a pigment treated by the method of the invention as hereinbefore described, including high molecular weight material pigmented with the novel particulate compositions as hereinbefore defined. High molecular weight materials which may be pigmented with a pigment treated in accordance with the invention include cellulose ethers and esters such as ethylcellulose, nitrocellulose, cellulose acetate, cellulose butyrate, aminoplasts such as urea-formaldehyde and melamine-formaldehyde resins, alkyd resins, phenoplasts, polycarbonates, polyolefines, polystyrenes, polyvinyl chlorides, polyamides, polyurethanes, polyesters, rubbers, casein and silicones. These high molecular weight materials may be in the form of solids or liquids or in solution, for example in spinning solutions, varnishes, paints and printing inks. The coated pigments produced by the method of the invention are generally incorporated in an amount of 0.01 to 30%, preferably 0.1 to 15%, by weight of the high molecular weight material.

The improved storage stability which can be achieved by the present invention is particularly useful for pigments to be used with high molecular weight materials such as alkyd resins in surface coating compositions such as paints or printing inks.

The invention is illustrated by the following Examples, in which parts and percentages are by weight unless otherwise indicated.

EXAMPLE 1

C.I. Pigment Yellow 74 aqueous presscake (33% solids) (182 g) is re-dispersed in 600 ml water in a conventional manner. To the resulting aqueous suspension at room temperature is added a solution of polyvinylalcohol having a number average molecular weight of 14,000 (6.1 g, 10% on pigment weight) dissolved in water (300 ml). The mixture is stirred for 2.5 hours. A solution of boric acid (1.71 g, 0.2 mol per mol of vinyl alcohol) dissolved in water (60 ml) is added. The temperature is raised to 80° C. and the pH increased to 8.1 by addition of dilute aqueous sodium hydroxide. The mixture is stirred for 1 hour at 80° C. After cooling to 70° C., the product is isolated by filtration, washed with water and kept as presscake. The presscake is dried at 65° C. in an oven just prior to testing. The product thus obtained is found to have improved powder storage stability compared with the untreated pigment (see Table 1).

EXAMPLE 2

CI Pigment Yellow 74 aqueous presscake (33% solids) (60 g) is re-dispersed in 100 g of a 2% solution of ethylcellulose in isopropanol (10% ethylcellulose on pigment weight). Isopropanol (150 ml) is added and the mixture is stirred for 85 minutes. Water (250 ml) is then added over 75 minutes at room temperature. A solution of sodium tetraborate (0.33 g, 0.2 mol per mol of ethylcellulose) in water (20 ml) is added. The temperature is raised to 70° C. and the pH increased to 7.8 by addition of dilute aqueous sodium hydroxide. The mixture is stirred for 1 hour at 70° C. The product is isolated by filtration, washed with water and kept as presscake. The presscake is dried at 65° C. just prior to testing. The product thus obtained is found to have improved powder storage stability compared with the untreated pigment.

EXAMPLE 3

CI Pigment Yellow 74 aqueous presscake (33% solids) (182 g) is re-dispersed in water (700 ml) in a conventional manner. To the resulting aqueous suspension at room temperature is added a solution of a polyvinyl alcohol having a number average molecular weight of 14,000 (6.0 g) dissolved in water (600 ml). The mixture is stirred for 17 hours, sodium tetraborate (4.14 g) (0.08 mol per mol of vinyl alcohol) is added and the temperature is increased to 85° C. The mixture is stirred at 85° C. for 90 mins. After cooling to 70° C., the product is isolated by filtration, washed with water and kept as presscake. The presscake is dried at 65° C., just prior to testing. The product thus obtained is found to have improved powder storage stability compared with the untreated pigment (see Table 1).

EXAMPLE 4

To a CI Pigment Yellow 74 aqueous slurry (8.4% pigment) (806 g) is added a solution of a polyvinyl alcohol having a number average molecular weight of 14,000 (6.8 g) in water (100 ml). The slurry is stirred for 15 minutes and heated at 85°–90° C. for 15 minutes. After cooling to 70° C., the product is isolated by filtration, washed with water and dried at 70° C. in an oven. The dried product is sieved and tested and found to have improved powder storage stability compared with the untreated pigment (see Table 2).

EXAMPLE 5

C.I. Pigment Yellow 74 aqueous presscake (32% solids) (188 g) is redispersed in water (700 ml) in a conventional manner. To the resulting aqueous suspension at room temperature is added a solution of a polyvinyl alcohol having a number average molecular weight of 18,000 (6.0 g, 10% on pigment weight) in water (500 ml). The mixture is stirred for 3 hours and allowed to stand overnight. The temperature of the mixture is then increased to 75° C. and the pH is increased to 8.5 by addition of dilute aqueous sodium hydroxide. After stirring at 75° C. for 90 minutes, a solution of 3-(trimethoxysilyl)propyl methacrylate (1.26 g) in isopropanol (20 ml) is added. The temperature is increased to 80° C. and stirring is continued for 2 hours. The coated pigment is isolated by filtration, washed with water and kept as presscake. The presscake is dried at 65° C. in an oven just prior to testing. The product obtained is found to have improved powder storage stability compared with the untreated pigment (see Table 3).

EXAMPLE 6

C.I. Pigment Yellow 74 aqueous presscake (32% solids, 188 g) is redispersed in water (700 ml) in a conventional manner. To the resulting aqueous suspension at room temperature is added a solution of a poly(N-vinyl-2-pyrrolidone) having a number average molecular weight of 38,000 (6.0 g, 10% on pigment weight) in water (350 ml). The mixture is stirred for 6 hours at room temperature, after which the temperature of the mixture is raised to 80° C. and stirring continued for a further 90 minutes. The coated pigment is isolated by filtration, washed with water and kept as presscake. The presscake is dried at 65° C. just prior to testing. The product obtained is found to have improved powder storage stability compared with the untreated pigment (see Table 3).

EXAMPLE 7

CI Pigment Yellow 74 aqueous presscake (26% solids) (270 g) is redispersed in water (500 ml) in a conventional manner. To the aqueous suspension obtained is added a solution of 10.5 g of Zinpol 1519—40%—W-/IPA—a 40% solution of a polyacrylic acid in water/isopropanol available from Worlée Chemie-in water (60 g) and the mixture is stirred and boiled at 99° C. for 15 minutes. A solution of zinc acetate (1.4 g) in water (60 g) is added and the pH of the mixture is adjusted to 9.0 with dilute aqueous sodium hydroxide. The mixture is boiled at 99° C. for a further 15 mins and then cooled to 70° C. The coated pigment is isolated by filtration, washed with water and dried at 70° C. The dried product is sieved, tested and found to have improved powder storage stability (see Table 4).

EXAMPLE 8

CI Pigment Yellow 74 aqueous presscake (26% solids) (270 g) is redispersed in water (500 ml) in a conventional manner. To the aqueous suspension obtained is added a solution of a polyvinyl alcohol having a number average molecular weight of 18,000 (4.2 g) in water (50 g) and the mixture is stirred and boiled at 99° C. for 15 mins. A solution of sodium orthophosphate (1.4 g) in water (50 g) is added and the pH of the mixture is adjusted to 8.0 with dilute aqueous sodium hydroxide. The mixture is boiled at 99° C. for a further 15 mins and then cooled at 70° C. The coated pigment is isolated by filtration, washed with water and dried at 70° C. The dried product is sieved, tested and found to have improved powder storage stability (see Table 4).

EXAMPLE 9

CI Pigment Yellow 74 aqueous presscake (26% solids) (270 g) is redispersed in water (500 ml) in a conventional manner. To the aqueous suspension obtained is added a solution of Zinpol 1519–40%-W/IPA (10.5 g) in water (50 g) and the mixture is stirred and boiled at 99° C. for 15 mins and then cooled to 70° C. The coated pigment is isolated by filtration, washed with water and dried at 70° C. The dried product is sieved, tested and found to have improved powder storage stability (see Table 4).

EXAMPLE 10

To CI Pigment Yellow 74 aqueous slurry (5% pigment) (350 g) is added a solution of a polyvinyl alcohol having a number average molecular weight of 18,000 (17.5 g) in water (100 ml). The slurry is heated at 99° C.

for 2 hours. A solution of zirconium acetate (32 g of a 22% ZrO₂ solution) in water is added and heating continued for 5 mins. The coated pigment is isolated by filtration, washed with water and dried at 68° C. in an oven. The dried product is sieved and tested and found to have improved powder storage stability compared with the untreated pigment (see Table 5).

EXAMPLES 11 TO 19

To determine the powder storage stability of pigments treated by the method of the invention, as well as the corresponding untreated pigment, the dried pigments are incorporated in a conventional manner into an alkyd paint system (SORBAL P470, an alkyd resin ex DSM Resins Ltd having a solids content 70%, white spirit, pigment; and driers solution).

|  | MILLBASE | FINAL PAINT |
|---|---|---|
| PIGMENTATION | 20% | 10% |
| PIGMENT/BINDER | 1/1.4 | 1/4.7 |
| SOLIDS CONTENT | 35% | 54% |

The dried powders are each divided into two portions. One portion is tested in the above paint system immediately after drying. The other portion is stored at 40° C. for 1 month before the paint is prepared. The tinting strengths are assessed visually and instrumentally using datacolour DC-3890.

The results are given in Tables 1 to 5. The values correspond to the parts of pigment required to give an equal tinting strength to a defined standard. Lower values denote higher tinting strengths.

TABLE 1

| Example | Pigment | Amount of Pigment Required Initial | 1 month | Loss of Strength |
|---|---|---|---|---|
| Control | CI Pigment Yellow 74 | 80 | 103 | 23 |
| 11 | Example 1 | 95 | 107 | 12 |
| 12 | Example 3 | 100 | 102 | 2 |

TABLE 2

| Example | Pigment | Amount of Pigment Required Initial | 1 month | Loss of Strength |
|---|---|---|---|---|
| Control | CI Pigment Yellow 74 | 77 | 82 | 5 |
| 13 | Example 4 | 82 | 82 | 0 |

TABLE 3

| Example | Pigment | Amount of Pigment Required Initial | 1 month | Loss of Strength |
|---|---|---|---|---|
| Control | CI Pigment Yellow 74 | 62 | 80 | 18 |
| 14 | Example 5 | 78 | 89 | 11 |
| 15 | Example 6 | 60 | 73 | 13 |

TABLE 4

| Example | Pigment | Amount of Pigment Required Initial | 1 month | Loss of Strength |
|---|---|---|---|---|
| Control | CI Pigment Yellow 74 | 80 | 95 | 15 |
| 16 | Example 7 | 125 | 130 | 5 |
| 17 | Example 8 | 80 | 85 | 5 |
| 18 | Example 9 | 120 | 120 | 0 |

TABLE 5

| Example | Pigment | Amount of Pigment Required Initial | 1 month | Loss of Strength |
|---|---|---|---|---|
| Control | CI Pigment Yellow 74 | 107 | 125 | 18 |
| 19 | Example 10 | 93 | 95 | 2 |

What is claimed is:

1. A method of improving the storage stability of a colored organic pigment in powder form which comprises coating pigment particles with a solid polymer which is a polar group-containing vinyl polymer, said polar group being a hydroxy, carboxyl, carboxylic ester, anhydride or carboxamide group, and crosslinking the polymer coating on the pigment by treating the polymer with a crosslinking agent therefor, thereby inhibiting reduction of tinting strength of the pigment on storage.

2. A method according to claim 1, in which the polymer is a polyhydroxy vinyl polymer, a polycarboxy vinyl polymer or a N-vinyl pyrrolidone polymer.

3. A method according to claim 2, in which the polymer is a polyvinyl alcohol, a polyacrylic acid or a homopolymer of N-vinyl-2-pyrrolidone.

4. A method according to claim 1, in which the pigment particles are coated by mixing the solid polymer, or a solution or dispersion thereof in a liquid, with a dispersion of the pigment until pigment particles are coated with the polymer, and coated pigment particles are separated from the resulting mixture.

5. A method according to claim 4, in which a solution of the polymer in water, a water-miscible organic solvent or a mixture of water and said solvent is mixed with an aqueous dispersion of the pigment.

6. A method according to claim 4, in which the mixture of pigment dispersion and the polymer, or the solution or dispersion thereof, is heated.

7. A method according to claim 1, in which the polymer is used in an amount of 0.1 to 20% by weight of the pigment.

8. A method according to claim 1, in which the crosslinking agent is a boric acid or a salt thereof, a phosphoric acid or a salt thereof, a silicon (IV) trialkoxide or tetra-alkoxide, a silicate which forms active silica on hydrolysis, an aluminate which forms alumina on hydrolysis, a zirconium (IV) compound or a zinc compound.

9. A method according to claim 8, in which the crosslinking agent is boric acid, sodium tetraborate, sodium orthophosphate, 3-(trimethoxysilyl)propyl methacrylate, sodium silicate, zirconium (IV) acetate or zinc acetate.

10. A method according to claim 1, in which the crosslinking agent or a solution thereof in water, a water-miscible organic solvent or a mixture thereof is mixed with an aqueous dispersion of the polymer-coated pigment and, after crosslinking, pigment particles having a crosslinked coating are separated from the resulting reaction mixture.

11. A method according to claim 10, in which the mixture of the aqueous dispersion of the polymer-coated pigment and the crosslinking agent has a pH from 7 to 10.

12. A method according to claim 10, in which the mixture of coated pigment dispersion and crosslinking agent is heated to effect crosslinking.

13. A particulate pigment composition comprising particles of a colored organic pigment coated with a crosslinked solid polar group-containing vinyl polymer.

14. A composition according to claim 13, in which the polar group is a hydroxy, carboxyl, carboxylic ester, anhydride or carboxamide group.

15. A composition according to claim 13, in which the polymer is a polyhydroxy vinyl polymer, a polycarboxy vinyl polymer or a N-vinylpyrrolidone polymer.

16. A composition according to claim 15, in which the polymer is a polyvinyl alcohol, a polyacrylic acid or a homopolymer of N-vinyl-2-pyrrolidone.

17. A composition according to claim 13, in which the polymer is a polyvinyl alcohol crosslinked by a boric acid or a salt thereof, a phosphoric acid or a salt thereof, a silicon (IV) trialkoxide or tetra-alkoxide, a silicate which forms active silica on hydrolysis, an aluminate which forms alumina on hydrolysis, or a zirconium (IV) compound, or the polymer is a polyacrylic acid crosslinked by a zinc compound.

18. A composition according to claim 17, in which the polymer is a polyvinyl alcohol crosslinked by boric acid, sodium tetraborate, sodium orthophosphate, 3-(trimethoxysilyl)propyl methacrylate, sodium silicate or zirconium acetate, or the polymer is a polyacrylic acid crosslinked by zinc acetate.

19. A composition according to claim 13, in which the pigment is a monoazo pigment or a basic dye complex.

20. A high molecular weight material pigmented with a composition according to claim 13.

* * * * *